(12) United States Patent
Houck et al.

(10) Patent No.: US 11,789,188 B2
(45) Date of Patent: Oct. 17, 2023

(54) OPTICAL FILTER

(71) Applicant: VIAVI Solutions Inc., San Jose, CA (US)

(72) Inventors: William D. Houck, Santa Rosa, CA (US); Daniel Meysing, Santa Rosa, CA (US)

(73) Assignee: VIAVI Solutions Inc., Chandler, AZ (US)

( * ) Notice: Subject to any disclaimer, the term of this patent is extended or adjusted under 35 U.S.C. 154(b) by 259 days.

(21) Appl. No.: 16/946,977

(22) Filed: Jul. 14, 2020

(65) Prior Publication Data

US 2021/0018664 A1 Jan. 21, 2021

Related U.S. Application Data

(60) Provisional application No. 62/876,387, filed on Jul. 19, 2019.

(51) Int. Cl.
   *G02B 5/28* (2006.01)
(52) U.S. Cl.
   CPC ............ *G02B 5/281* (2013.01); *G02B 5/284* (2013.01)
(58) Field of Classification Search
   CPC ........ G02B 5/281; G02B 5/288; G02B 5/284; G01J 2003/1247; G01J 3/26
   USPC ................................ 359/290, 578, 589, 587
   See application file for complete search history.

(56) References Cited

U.S. PATENT DOCUMENTS

| | | | |
|---|---|---|---|
| 6,529,328 B1* | 3/2003 | Cheng | H01S 3/10023 359/260 |
| 2007/0041416 A1* | 2/2007 | Koelle | H01S 5/18358 372/50.124 |
| 2007/0217045 A1* | 9/2007 | Chen | G02B 5/28 359/891 |
| 2008/0042782 A1 | 2/2008 | Wang et al. | |
| 2011/0049340 A1* | 3/2011 | Tisserand | G01J 3/26 250/226 |
| 2011/0299104 A1* | 12/2011 | Seo | G01J 3/0294 358/1.9 |

FOREIGN PATENT DOCUMENTS

| | | |
|---|---|---|
| EP | 1592067 A1 | 11/2005 |
| EP | 3187910 A1 | 7/2017 |
| EP | 3462148 A1 | 4/2019 |
| WO | 2017000069 A1 | 1/2017 |

OTHER PUBLICATIONS

International Search Report and Written Opinion for Application No. PCT/US2020/070281, dated Oct. 7, 2020, 9 pages.

* cited by examiner

*Primary Examiner* — Audrey Y Chang
(74) *Attorney, Agent, or Firm* — Harrity & Harrity, LLP

(57) ABSTRACT

An optical filter may comprise a first pair of mirrors, a second pair of mirrors, and a common spacer. The second pair of mirrors and the first pair of mirrors may reflect different portions of an electromagnetic spectrum. The common spacer may be positioned between the first pair of mirrors and between the second pair of mirrors.

20 Claims, 11 Drawing Sheets

OPTICAL FILTER

RELATED APPLICATION

This application claims priority to U.S. Provisional Patent Application No. 62/876,387, filed on Jul. 19, 2019, and entitled "OPTICAL FILTER," the content of which is incorporated by reference herein in its entirety.

BACKGROUND

An optical sensor device may be utilized to capture information. For example, the optical sensor device may capture information relating to a set of electromagnetic frequencies. The optical sensor device may include a set of sensor elements (e.g., optical sensors, spectral sensors, and/or image sensors) that capture the information. For example, an array of sensor elements may be utilized to capture information relating to multiple frequencies. The sensor element array may be associated with an optical filter. The optical filter may include one or more channels that respectively pass particular frequencies to sensor elements of the sensor element array.

SUMMARY

In some implementations, an optical filter includes a first pair of mirrors; a second pair of mirrors, wherein the second pair of mirrors and the first pair of mirrors reflect different portions of an electromagnetic spectrum; and a common spacer positioned between the first pair of mirrors and between the second pair of mirrors.

In some implementations, a method of manufacturing an optical filter includes depositing, on a substrate, a first mirror, a second mirror, and a third mirror, wherein the first mirror, the second mirror, and the third mirror do not overlap each other; depositing, above the first mirror, the second mirror, and the third mirror, a common spacer; depositing, on the common spacer and opposite the first mirror, a fourth mirror, wherein the fourth mirror is paired with the first mirror to reflect a first portion of an electromagnetic spectrum; depositing, on the common spacer and opposite the second mirror, a fifth mirror, wherein the fifth mirror is paired with the second mirror to reflect a second portion of the electromagnetic spectrum; and depositing, on the common spacer and opposite the third mirror, a sixth mirror, wherein the sixth mirror is paired with the third mirror to reflect a third portion of the electromagnetic spectrum.

In some implementations, a method of manufacturing an optical filter includes depositing, on a substrate, a first mirror and a second mirror, wherein the first mirror and the second mirror do not overlap, wherein the first mirror is to reflect a set of first wavelengths of an electromagnetic spectrum, wherein the second mirror is to reflect a set of second wavelengths of the electromagnetic spectrum, and wherein second wavelengths of the set of second wavelengths are shifted with respect to first wavelengths of the set of first wavelengths; depositing, above the first mirror and the second mirror, a common spacer; and depositing, on the common spacer, opposite the first mirror, and opposite the second mirror, one or more additional mirrors.

DETAILED DESCRIPTION

Figure 1:
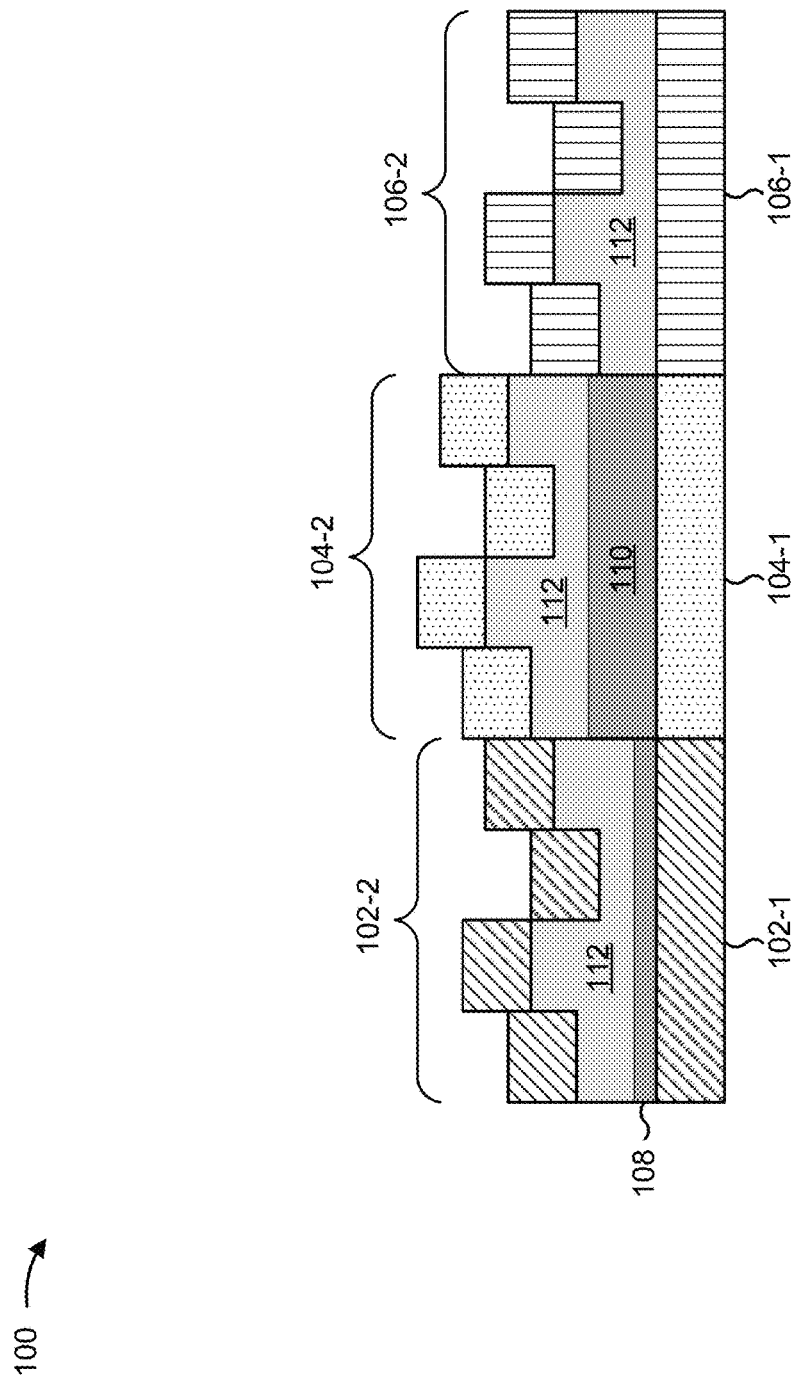
FIG. 1 is a diagram illustrating a side-view of an example optical filter described herein.

The following detailed description of example implementations refers to the accompanying drawings. The same reference numbers in different drawings may identify the same or similar elements.

An optical filter may use an interferometer, such as a Fabry-Perot interference filter, an etalon, and/or the like. An interferometer may pass light associated with a particular wavelength or wavelength range (that is in resonance with the interferometer) and may block other light. For example, the particular wavelength may be based on characteristics of the interferometer (e.g., a length of the interferometer, an optical path length of the interferometer, a reflectivity of surfaces of the interferometer, and/or the like). Some interferometers may include reflective surfaces, which are referred to herein as mirrors. Light may enter the interferometer and may reflect between the mirrors. Destructive interference may cause only the light associated with the particular wavelength to pass through the interferometer.

An optical device (e.g., comprising a spectrometer or one or more other optical sensors and/or spectral sensors) may use filtered light to perform a measurement associated with a particular wavelength. An interferometer or a set of interferometers may filter the light. In some cases, it may be beneficial to filter light to many different wavelengths, which may involve the use of many interferometers. However, the usage of many, different interferometers to measure wavelengths that are close to each other (e.g., in terms of filtered wavelengths) may present certain difficulties. For example, a resonant wavelength of the interferometer may be based on the optical path length in the interferometer (which may be a function of refractivity and length of the interferometer) and reflection characteristics of the mirrors of the interferometer. One way to vary the resonant wavelength, and thus the passed wavelength of light, is to change the length of the interferometer by varying a thickness of a spacer of the interferometer. However, generating many different interferometers on an optical filter with different spacer thicknesses may require many deposition runs (e.g., to deposit layers of the spacer), which increases cost and complexity of fabrication. Furthermore, if the optical device is to measure two wavelengths that are close to each other, then the difference between thicknesses of the corresponding spacers may be difficult or impossible to achieve, using deposition technology, due to challenges in thickness control.

Some implementations described herein provide an optical filter for which the passed wavelength is varied based on properties of mirrors of the optical filter and/or using shared spacers across multiple, different mirror designs. For example, some implementations described herein may consolidate spacer construction into a common deposition or a common set of depositions across multiple interferometers that have different mirror designs. By varying the different mirror designs, each mirror design may address a different wavelength region. Thus, filters can be generated that address multiple different wavelength regions using fewer coating runs than a filter in which wavelength regions are addressed by varying the spacer thickness. Furthermore, by varying the properties of the mirrors of the optical filters, more closely spaced wavelengths of filters may be achieved in comparison to varying the spacer thickness, since the mirrors may not be constrained by material properties and deposition precision of the spacer. Thus, construction cost and yield loss are reduced. For example, a design that spans three mirrors may be reduced from 21 coating runs to 13 coating runs while realizing 32 additional spectral channels in comparison to a filter generated by varying spacer thickness. Furthermore, a silicon-range (e.g., 400 to 1100 nanometers (nm)) spectroscopic filter may be generated using 15 coating runs. These techniques can also be applied for etching methods of creating multispectral filters.

FIG. 1 is a diagram illustrating a side-view of an example optical filter 100. As shown in FIG. 1, example optical filter 100 includes a first pair of mirrors 102 comprising mirror 102-1 and mirror 102-2, a second pair of mirrors 104 comprising mirror 104-1 and mirror 104-2, and a third pair of mirrors 106 comprising mirror 106-1 and mirror 106-2. Each mirror of the first pair of mirrors 102, the second pair of mirrors 104, or the third pair of mirrors 106 may comprise one or more metals, one or more dielectric materials, and/or the like. Each mirror in a pair of mirrors may have the same or similar (e.g., the same within a manufacturing tolerance) optical properties (e.g., may have a same or a similar amount of reflectivity, a same or a similar amount of transmission, a same or a similar amount of absorbency, and/or the like for a particular wavelength range). In some implementations, the first pair of mirrors 102 may be configured (e.g., as individual mirrors and/or as a pair of mirrors) to reflect a first portion of an electromagnetic spectrum (e.g., blue light); the second pair of mirrors 104 may be configured (e.g., as individual mirrors and/or as a pair of mirrors) to reflect a second portion of the electromagnetic spectrum (e.g., green light); and/or the third pair of mirrors 106 may be configured (e.g., as individual mirrors and/or as a pair of mirrors) to reflect a third portion of the electromagnetic spectrum (e.g., red light).

As further shown in FIG. 1, a first baseline layer 108 may be positioned between the first pair of mirrors 102 (e.g., the first baseline layer 108 may be disposed between mirror 102-1 and mirror 102-2) and a second baseline layer 110 may be positioned between the second pair of mirrors 104 (e.g., the second baseline layer 110 may be disposed between mirror 104-1 and 104-2). For example, as shown in FIG. 1, first baseline layer 108 may be disposed on a top surface of mirror 102-1 and positioned below a bottom surface of mirror 102-2, and second baseline layer 110 may be disposed on a top surface of mirror 104-1 and positioned below a bottom surface of mirror 104-2. The first baseline layer 108 may have a thickness based on the first portion of the electromagnetic spectrum (e.g., a thickness that facilitates reflection of light associated with the first portion of the electromagnetic spectrum by the first pair of mirrors 102), and the second baseline layer 110 may have a thickness based on the second portion of the electromagnetic spectrum (e.g., a thickness that facilitates reflection of light associated with the second portion of the electromagnetic spectrum by the second pair of mirrors 104).

As further shown in FIG. 1, a common spacer 112 may be positioned between the first pair of mirrors 102 (e.g., the common spacer 112 may be disposed between mirror 102-1 and mirror 102-2), the second pair of mirrors 104 (e.g., the common spacer 112 may be disposed between mirror 104-1 and mirror 104-2), the third pair of mirrors 106 (e.g., the common spacer 112 may be disposed between mirror 106-1 and mirror 106-2). For example, as shown in FIG. 1, the common spacer 112 be disposed on a top surface of the first baseline layer 108 (e.g., positioned above the top surface of mirror 102-1 and below the bottom surface of mirror 102-2), on a top surface of the second baseline layer 110 (e.g., positioned above the top surface of mirror 104-1 and below the bottom surface of mirror 104-2), and/or on a top surface of mirror 106-1 (e.g., positioned above the top surface of mirror 106-1 and below the bottom surface of mirror 106-2).

In some implementations, the common spacer 112 may comprise one or more layers (e.g., one or more spacer layers). In some implementations, the common spacer 112 may comprise less than a threshold number of layers, such as 10 layers. As further shown in FIG. 1, a thickness of the common spacer 112 may vary across the example optical filter 100. For example, the common spacer 112 may include a plurality of sections where one section comprises a number of layers that is different than a number of layers of another section. As further shown in FIG. 1, a varying pattern of thickness of the common spacer 112 across the first pair of mirrors 102 may be the same as a varying pattern of thickness of the common spacer 112 across the second pair of mirrors 104 and/or the third pair of mirrors 106.

As indicated above, FIG. 1 is provided merely as an example. Other examples are contemplated and may differ from what is described with regard to FIG. 1.

Figure 2:
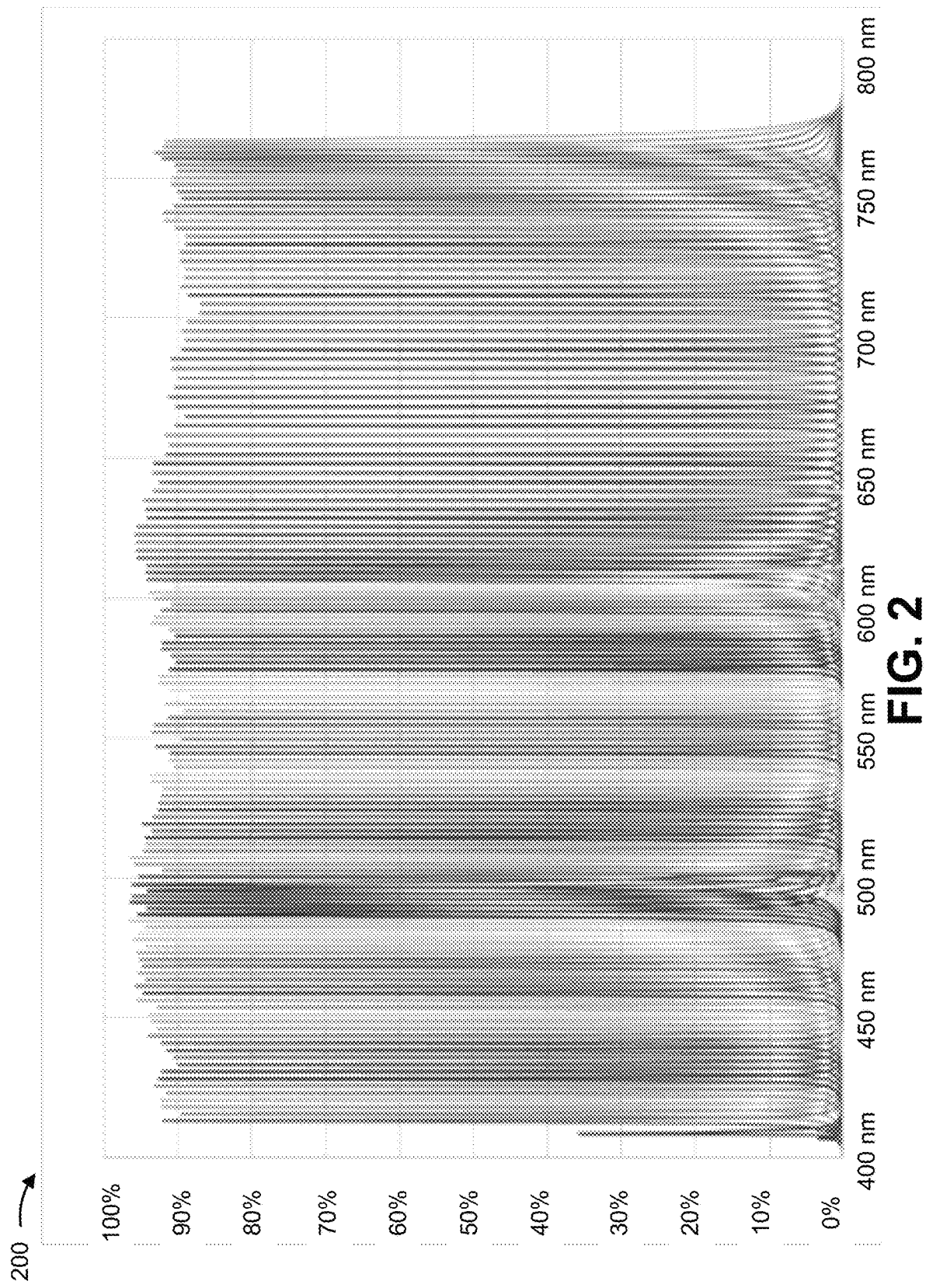
FIG. 2 is a plot of example transmission percentages associated with the example optical filter described in FIG. 1.

FIG. 2 is a plot 200 of example transmission percentages associated with the example optical filter 100. As shown in FIG. 2, the example optical filter 100 may filter light associated with a portion of the electromagnetic spectrum (e.g., from about 400 nm to about 800 nm). As further shown in FIG. 2, the example optical filter 100 provides a transmission percentage above 85% for nearly all wavelengths (and above 90% for most wavelengths) within the portion of the electromagnetic spectrum. As indicated above, FIG. 2 is provided merely as an example. Other examples are contemplated and may differ from what is described with regard to FIG. 2.

Figure 3:
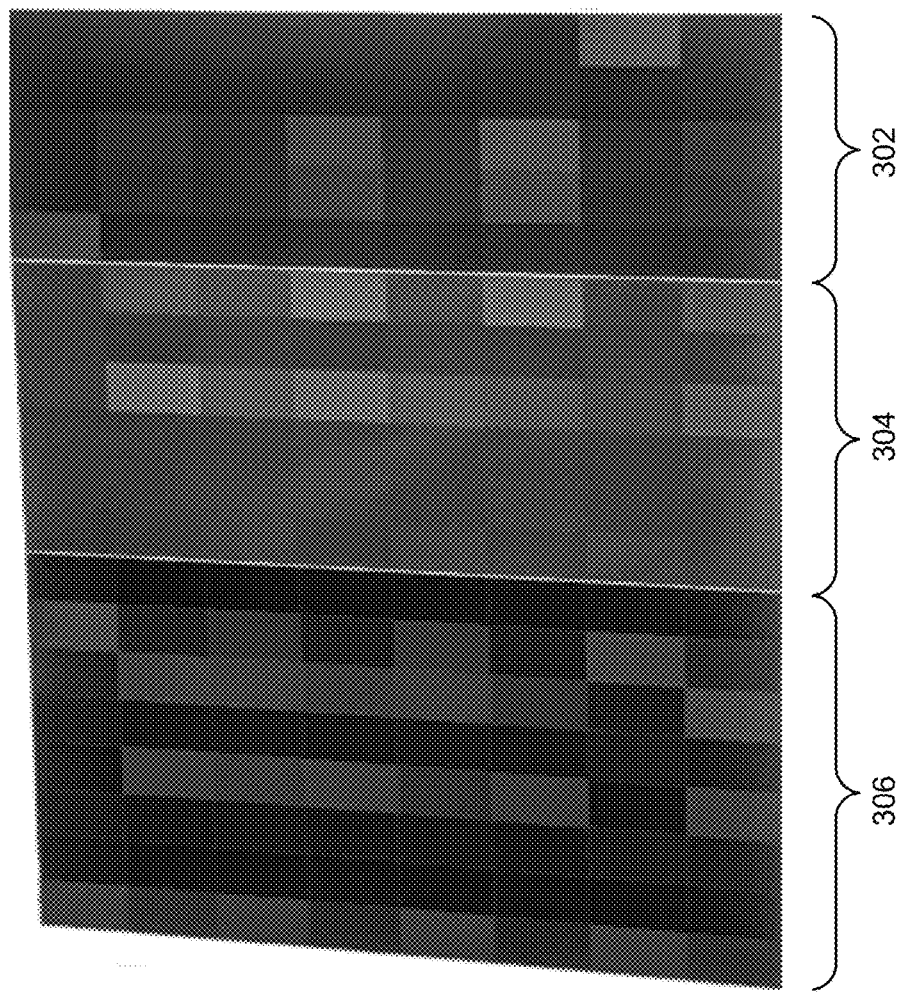
FIG. 3 is a diagram illustrating a top-down view an example optical filter described herein.

FIG. 3 is a diagram illustrating a top-view of an example optical filter 300 described herein. As shown in FIG. 3, the example optical filter 300 may be associated with three sections, section 302, section 304, and section 306. Each section may be associated with a pair of mirrors and a common spacer (not visible in FIG. 3) that may be positioned between the respective pair of mirrors of each section (e.g., as described herein in relation to FIG. 1). As further shown in FIG. 3, each section may include a respective number of channels. For example, section 302 may include 40 channels (e.g., 5×8 channels), section 304 may include 48 channels (e.g., 6×8 channels), and section 306 may include 64 channels (e.g., 8×8 channels). Accordingly, example optical filter 300 may include 152 channels. Other implementations are also contemplated, where example optical filter 300 may include 128 channels, 192 channels, 256 channels, and/or the like.

As indicated above, FIG. 3 is provided merely as an example. Other examples are contemplated and may differ from what is described with regard to FIG. 3.

Figure 4:
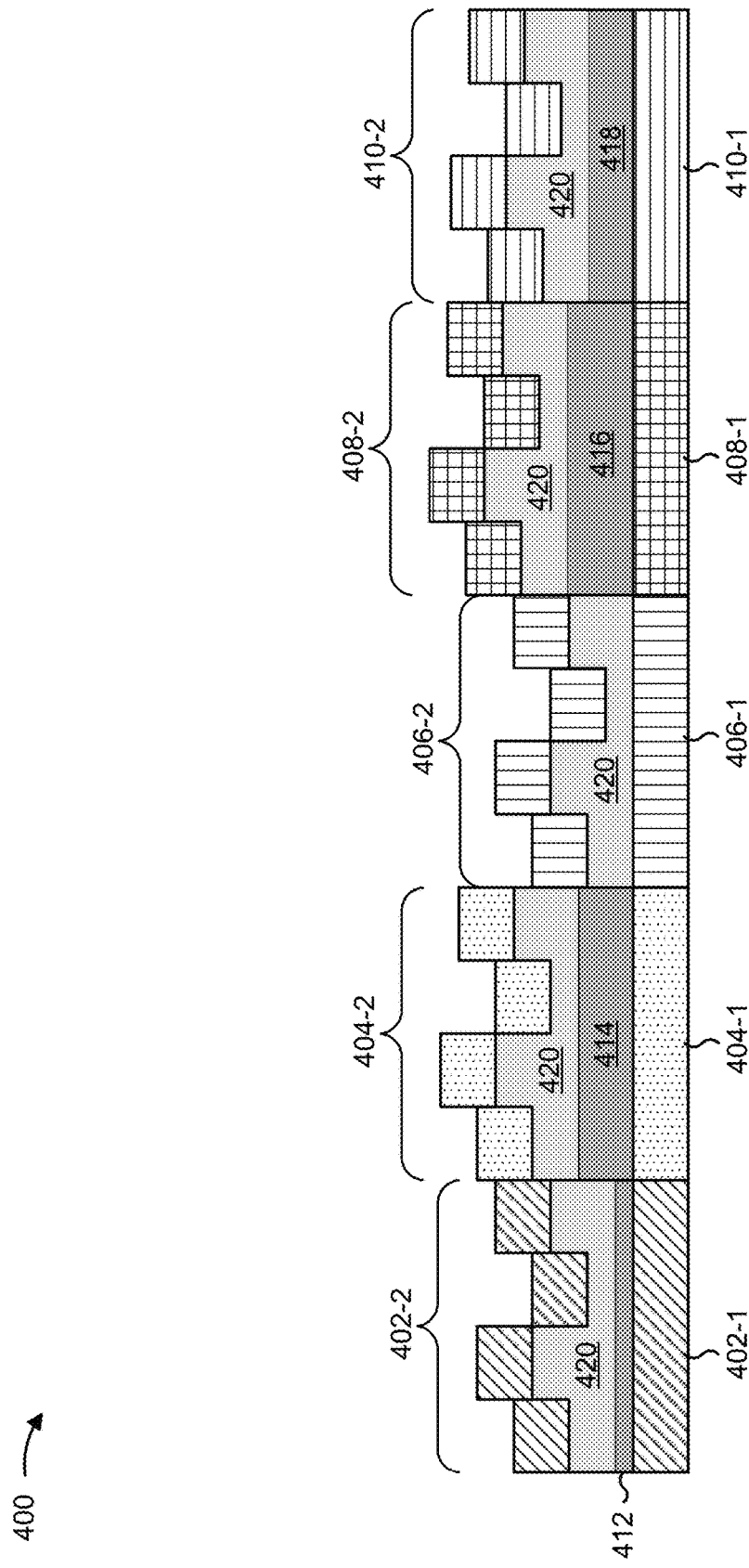
FIG. 4 is a diagram illustrating a side-view of an example optical filter described herein.

FIG. 4 is a diagram illustrating a side-view of an example optical filter 400. As shown in FIG. 4, example optical filter 400 includes a first pair of mirrors 402 comprising mirror 402-1 and mirror 402-2, a second pair of mirrors 404 comprising mirror 404-1 and mirror 404-2, a third pair of mirrors 406 comprising mirror 406-1 and mirror 406-2, a fourth pair of mirrors 408 comprising mirror 408-1 and mirror 408-2, and a fifth pair of mirrors 410 comprising mirror 410-1 and mirror 410-2. Each mirror of the first pair of mirrors 402, the second pair of mirrors 404, the third pair of mirrors 406, the fourth pair of mirrors 408, or the fifth pair of mirrors 410 may comprise one or more metals, one or more dielectric materials, and/or the like. Each mirror in a pair of mirrors may have the same or similar optical properties (e.g., may have a same or a similar amount of reflectivity, a same or a similar amount of transmission, a same or a similar amount of absorbency, and/or the like for a particular wavelength range). In some implementations, the first pair of mirrors 402 may be configured (e.g., as individual mirrors and/or as a pair of mirrors) to reflect a first portion of an electromagnetic spectrum (e.g., blue light); the second pair of mirrors 404 may be configured (e.g., as individual mirrors and/or as a pair of mirrors) to reflect a second portion of the electromagnetic spectrum (e.g., green light); the third pair of mirrors 406 may be configured (e.g., as individual mirrors and/or as a pair of mirrors) to reflect a third portion of the electromagnetic spectrum (e.g., red light); the fourth pair of mirrors 408 may be configured (e.g., as individual mirrors and/or as a pair of mirrors) to reflect a fourth portion of the electromagnetic spectrum (e.g., a first portion of near-infrared light); and/or the fifth pair of mirrors 410 may be configured (e.g., as individual mirrors and/or as a pair of mirrors) to reflect a fifth portion of the electromagnetic spectrum (e.g., a second portion of near-infrared light).

As further shown in FIG. 4, a first baseline layer 412 may be positioned between the first pair of mirrors 402 (e.g., the first baseline layer 412 may be disposed between mirror 402-1 and mirror 402-2), a second baseline layer 414 may be positioned between the second pair of mirrors 404 (e.g., the second baseline layer 414 may be disposed between mirror 404-1 and 404-2), a third baseline layer 416 may be positioned between the fourth pair of mirrors 408 (e.g., the third baseline layer 416 may be disposed between mirror 408-1 and 408-2), and a fourth baseline layer 418 may be positioned between the fifth pair of mirrors 410 (e.g., the fourth baseline layer 418 may be disposed between mirror 410-1 and 410-2). For example, as shown in FIG. 4, first baseline layer 412 may be disposed on a top surface of mirror 402-1 and positioned below a bottom surface of mirror 402-2, second baseline layer 414 may be disposed on a top surface of mirror 404-1 and positioned below a bottom surface of mirror 404-2, third baseline layer 416 may be disposed on a top surface of mirror 408-1 and positioned below a bottom surface of mirror 408-2, and/or fourth baseline layer 418 may be disposed on a top surface of mirror 410-1 and positioned below a bottom surface of mirror 410-2. The first baseline layer 412 may have a thickness based on the first portion of the electromagnetic spectrum (e.g., a thickness that facilitates reflection of light associated with the first portion of the electromagnetic spectrum by the first pair of mirrors 402), the second baseline layer 414 may have a thickness based on the second portion of the electromagnetic spectrum (e.g., a thickness that facilitates reflection of light associated with the second portion of the electromagnetic spectrum by the second pair of mirrors 404), the third baseline layer 416 may have a thickness based on the fourth portion of the electromagnetic spectrum (e.g., a thickness that facilitates reflection of light associated with the fourth portion of the electromagnetic spectrum by the fourth pair of mirrors 408), and/or the fourth baseline layer 418 may have a thickness based on the fifth portion of the electromagnetic spectrum (e.g., a thickness that facilitates reflection of light associated with the fifth portion of the electromagnetic spectrum by the fifth pair of mirrors 410).

As further shown in FIG. 4, a common spacer 420 may be positioned between the first pair of mirrors 402 (e.g., the common spacer 420 may be disposed between mirror 402-1 and mirror 402-2), the second pair of mirrors 404 (e.g., the common spacer 420 may be disposed between mirror 404-1 and mirror 404-2), the third pair of mirrors 406 (e.g., the common spacer 420 may be disposed between mirror 406-1 and mirror 406-2), the fourth pair of mirrors 408 (e.g., the common spacer 420 may be disposed between mirror 408-1 and mirror 408-2), and/or the fifth pair of mirrors 410 (e.g., the common spacer 420 may be disposed between mirror 410-1 and mirror 410-2). For example, as shown in FIG. 4, the common spacer 420 may be disposed on a top surface of the first baseline layer 412 (e.g., positioned above the top surface of mirror 402-1 and below the bottom surface of mirror 402-2), on a top surface of the second baseline layer 414 (e.g., positioned above the top surface of mirror 404-1 and below the bottom surface of mirror 404-2), on a top surface of mirror 406-1 (e.g., positioned above the top surface of mirror 406-1 and below the bottom surface of mirror 406-2), on a top surface of the third baseline layer 416 (e.g., positioned above the top surface of mirror 408-1 and below the bottom surface of mirror 408-2), and/or on a top surface of the fourth baseline layer 418 (e.g., positioned above the top surface of mirror 410-1 and below the bottom surface of mirror 410-2).

In some implementations, the common spacer 420 may comprise one or more layers (e.g., one or more spacer layers). In some implementations, the common spacer 112 may comprise less than a threshold number of layers, such as 10 layers. As further shown in FIG. 4, a thickness of the common spacer 420 may vary across the example optical filter 400. For example, the common spacer 420 may include a plurality of sections where one section comprises a number of layers that is different than a number of layers of another section. As further shown in FIG. 4, a varying pattern of thickness of the common spacer 420 across the first pair of mirrors 402 may be the same as a varying pattern of thickness of the common spacer 420 across the second pair of mirrors 404, the third pair of mirrors 406, the fourth pair of mirrors 408, and/or the fifth pair of mirrors 410.

As indicated above, FIG. 4 is provided merely as an example. Other examples are contemplated and may differ from what is described with regard to FIG. 4.

Figure 5:
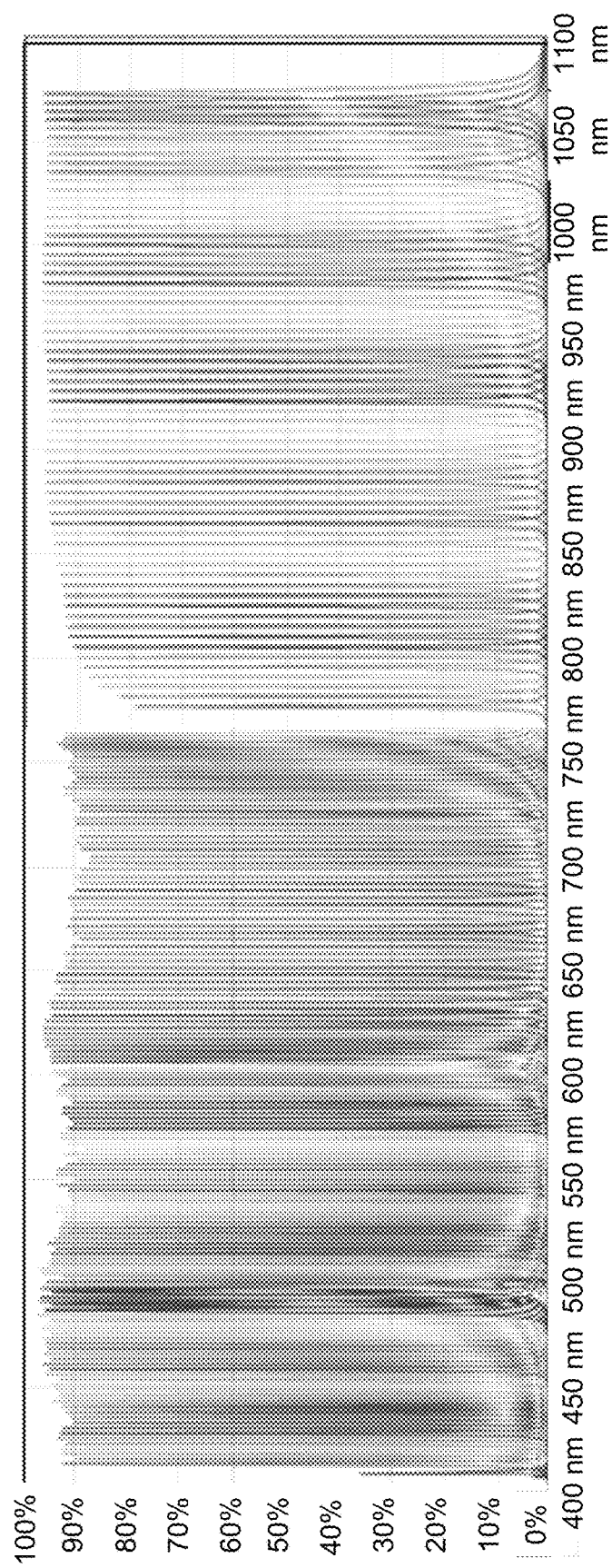
FIG. 5 is a plot of example transmission percentages associated with the example optical filter described in FIG. 4.

FIG. 5 is a plot 500 of example transmission percentages associated with the example optical filter 400. As shown in FIG. 5, the optical filter 400 may filter light associated with a portion of the electromagnetic spectrum (e.g., from about 400 nm to about 1100 nm). As further shown in FIG. 5, the example optical filter 400 provides a transmission percentage above 75% for nearly all wavelengths (and above 90% for most wavelengths) within the portion of the electromagnetic spectrum. As indicated above, FIG. 5 is provided merely as an example. Other examples are contemplated and may differ from what is described with regard to FIG. 5.

Figure 6:
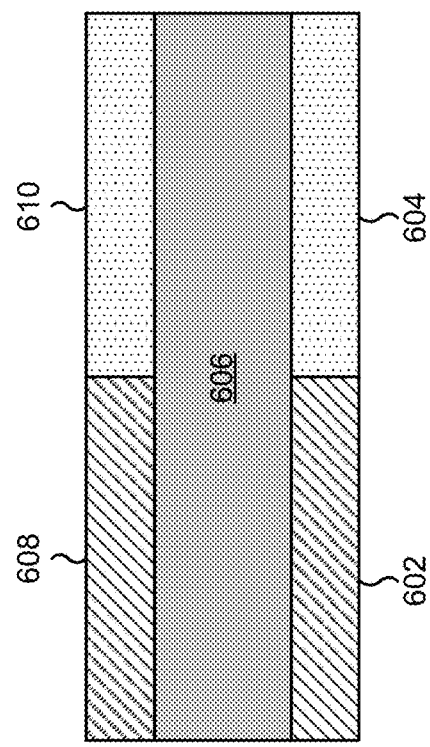
FIG. 6 is a diagram illustrating a side-view of an example optical filter described herein.

FIG. 6 is a diagram illustrating a side-view of an example optical filter 600. As shown in FIG. 6, example optical filter 600 includes a mirror 602, a mirror 604, a common spacer 606, a mirror 608, and a mirror 610. As shown in FIG. 6, the common spacer 606 may be positioned between a first layer of mirrors (e.g., comprising mirror 602 and mirror 604) and a second layer of mirrors (e.g., comprising mirror 608 and mirror 610) in a similar manner as that described herein in relation to common spacer 112 and common spacer 420. Common spacer 606 may comprise one or more layers and may vary in thickness across the example optical filter 600 in a similar manner as that described herein in relation to common spacer 112 and common spacer 420.

As shown in FIG. 6, mirror 602 may be paired with mirror 608 (e.g., mirror 608 is above a top surface of mirror 602 and mirror 602 is below a bottom surface of mirror 608) and mirror 604 may be paired with mirror 610 (e.g., mirror 610 is above a top surface of mirror 604 and mirror 604 is below a bottom surface of mirror 610). Each mirror may comprise one or more metals, one or more dielectric materials, and/or the like.

As indicated by the diagonal shading pattern of mirror 602 and mirror 608 in FIG. 6, mirror 602 and mirror 608 may have the same or similar optical properties (e.g., may have the same or a similar amount of reflectivity, a same or a similar amount of transmission, a same or a similar amount of absorbency, and/or the like for a particular wavelength range). In some implementations, mirror 602 and mirror 608 may be configured to reflect a first portion of an electromagnetic spectrum (e.g., blue light) where mirror 602 is configured to reflect a first wavelength range of the first portion of the electromagnetic spectrum and mirror 608 is configured to reflect a second wavelength range of the first portion of the electromagnetic spectrum (e.g., mirror 602 and mirror 608 may be "mismatched" in the same color space), where a difference between a representative wavelength of the first wavelength range (e.g., the median wavelength of the first wavelength range) and a representative wavelength of the second wavelength range (e.g., the median wavelength of the second wavelength range) is less than or equal to a threshold, such as 10 nm.

As indicated by the dotted shading pattern of mirror 604 and mirror 610 in FIG. 6, mirror 604 and mirror 610 may have the same or similar optical properties (e.g., may have a same or a similar amount of reflectivity, a same or a similar amount of transmission, a same or a similar amount of absorbency, and/or the like for a particular wavelength range). In some implementations, mirror 604 and mirror 610 may be configured to reflect a second portion of the electromagnetic spectrum (e.g., green light) where mirror 604 is configured to reflect a first wavelength range of the second portion of the electromagnetic spectrum and mirror 610 is configured to reflect a second wavelength range of the second portion of the electromagnetic spectrum (e.g., mirror 604 and mirror 610 may be "mismatched" in the same color space), where a difference between a representative wavelength of the first wavelength range (e.g., the median wavelength of the first wavelength range) and a representative wavelength of the second wavelength range (e.g., the median wavelength of the second wavelength range) is less than or equal to a threshold, such as 10 nm.

In this way, example optical filter 600 may provide a first pair of mismatched mirrors (e.g., mirror 602 and mirror 608) to provide greater fidelity in discerning wavelength ranges associated with the first portion of the electromagnetic spectrum and a second pair of mismatched mirrors (e.g., mirror 604 and mirror 610) to provide greater fidelity in discerning wavelength ranges associated with the second portion of the electromagnetic spectrum.

As indicated above, FIG. 6 is provided merely as an example. Other examples are contemplated and may differ from what is described with regard to FIG. 6.

Figure 7:
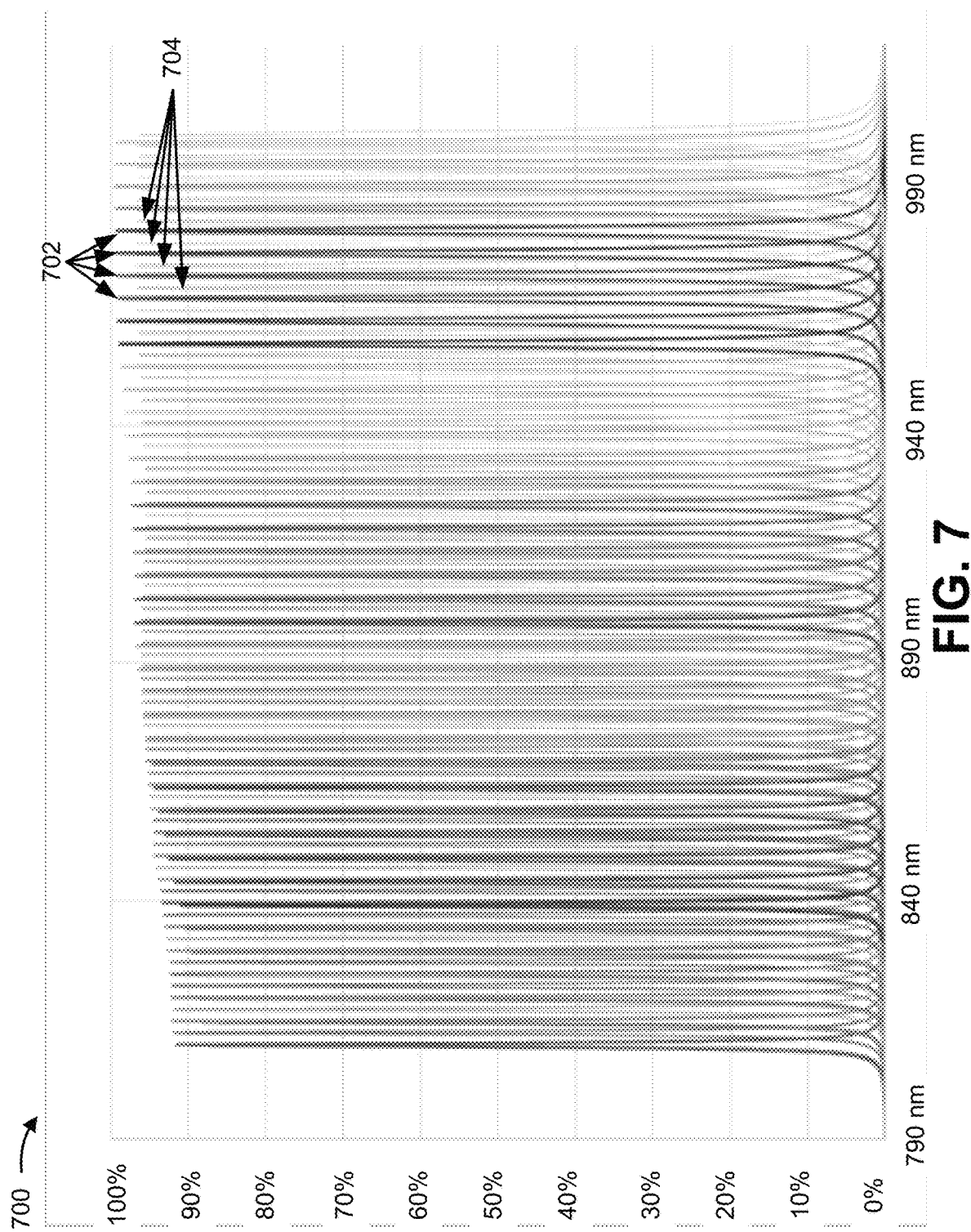
FIG. 7 is a plot of example transmission percentages associated with the example optical filter described in FIG. 6.

FIG. 7 is a plot 700 of example transmission percentages associated with the example optical filter 600. As shown in FIG. 7, the example optical filter 600 may filter light associated with a portion of the electromagnetic spectrum (e.g., from about 790 nm to about 990 nm). As further shown in FIG. 7, the example optical filter 600 provides a transmission percentage above 85% for nearly all wavelengths (and above 90% for most wavelengths) within the portion of the electromagnetic spectrum. As further shown in FIG. 7, a first mirror of a pair of mirrors of the example optical filter 600 may transmit, for a particular wavelength range, a first wavelength of light 702 at a first transmission percentage and may transmit a second wavelength of light 704 (e.g., that has a wavelength shift that is less than or equal to a threshold, such as 3 nm, from the first wavelength) at a second transmission percentage. As shown in FIG. 7, for any wavelength range, the first transmission percentage is higher than the second transmission percentage.

As indicated above, FIG. 7 is provided merely as an example. Other examples are contemplated and may differ from what is described with regard to FIG. 7.

Figure 8:
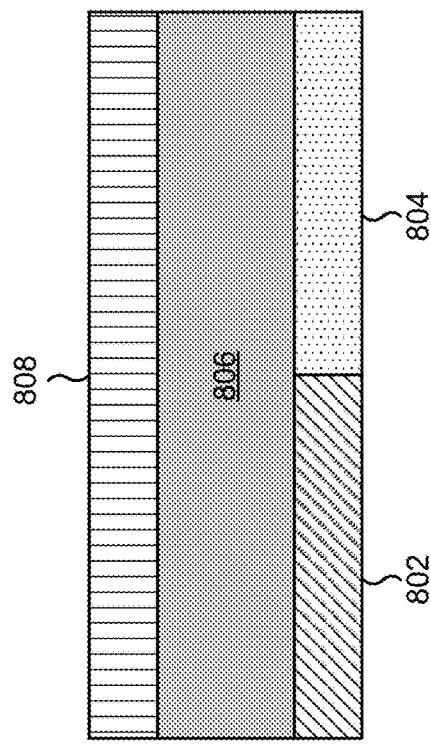
FIG. 8-9 are diagrams illustrating side-views of example optical filters described herein.

FIG. 8 is a diagram illustrating an example optical filter 800. As shown in FIG. 8, example optical filter 800 includes a first mirror 802, a second mirror 804, a common spacer 806, and third mirror 808. As shown in FIG. 8, the common spacer 806 may be positioned between a layer of mirrors (e.g., comprising mirror 802 and mirror 804) and mirror 808 in a similar manner as that described herein in relation to common spacer 112 and common spacer 420. Common spacer 806 may comprise one or more layers and may vary in thickness across the example optical filter 800 in a similar manner as that described herein in relation to common spacer 112 and common spacer 420.

As shown in FIG. 8, mirror 802 may be paired with mirror 808 (e.g., mirror 808 is above a top surface of mirror 802 and mirror 802 is below a bottom surface of mirror 808) and mirror 804 may be paired with mirror 808 (e.g., mirror 808 is above a top surface of mirror 804 and mirror 804 is below a bottom surface of mirror 808). Each mirror may comprise one or more metals, one or more dielectric materials, and/or the like. As indicated by the different shading patterns of the mirrors, mirror 802, mirror 804, and mirror 808 may have different optical properties (e.g., each mirror may have a different amount of reflectivity, a different amount of transmission, a different amount of absorbency, and/or the like for a particular wavelength range). In some implementations, the pair of mirror 802 and mirror 808 may be configured to reflect a portion of an electromagnetic spectrum (e.g., blue light) where mirror 802 is configured to reflect a first wavelength range of the portion of the electromagnetic spectrum and mirror 808 is configured to reflect a second wavelength range of the portion of the electromagnetic spectrum (e.g., mirror 802 and mirror 808 may be "mismatched" in the same color space). In some implementations, the pair of mirror 804 and mirror 808 may be configured to reflect the portion of the electromagnetic spectrum where mirror 804 is configured to reflect a third wavelength range of the portion of the electromagnetic spectrum and mirror 808 is configured to reflect the second wavelength range of the portion of the electromagnetic spectrum (e.g., mirror 804 and mirror 808 may be "mismatched" in the same color space).

In this way, example optical filter 800 may provide a first pair of mismatched mirrors (e.g., mirror 802 and mirror 808) and second pair of mismatched mirrors (e.g., mirror 804 and mirror 808) to provide greater fidelity in discerning wavelength ranges associated with the portion of the electromagnetic spectrum.

As indicated above, FIG. 8 is provided merely as an example. Other examples are contemplated and may differ from what is described with regard to FIG. 8.

Figure 9:
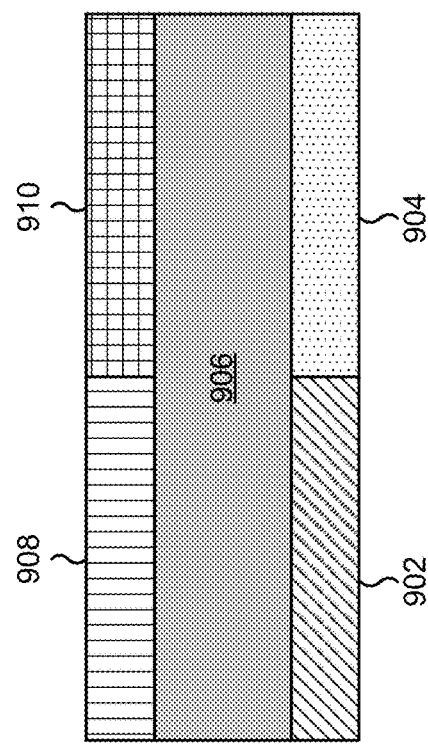

FIG. 9 is a diagram illustrating an example optical filter 900. As shown in FIG. 9, example optical filter 900 includes a first mirror 902, a second mirror 904, a common spacer 906, a third mirror 908, and a fourth mirror 910. As shown in FIG. 9, the common spacer 906 may be positioned between a first layer of mirrors (e.g., comprising mirror 902 and mirror 904) and a second layer of mirrors (e.g., comprising mirror 908 and mirror 910) in a similar manner as that described herein in relation to common spacer 112 and common spacer 420. Common spacer 906 may comprise one or more layers and may vary in thickness across the example optical filter 900 in a similar manner as that described herein in relation to common spacer 112 and common spacer 420.

As shown in FIG. 9, mirror 902 may be paired with mirror 908 (e.g., mirror 908 is above a top surface of mirror 902 and mirror 902 is below a bottom surface of mirror 908) and mirror 904 may be paired with mirror 910 (e.g., mirror 910 is above a top surface of mirror 904 and mirror 904 is below a bottom surface of mirror 910). Each mirror may comprise one or more metals, one or more dielectric materials, and/or the like. As indicated by the different shading patterns of the mirrors, mirror 902, mirror 904, mirror 908, and mirror 910 may have different optical properties (e.g., each mirror may have a different amount of reflectivity, a different amount of transmission, a different amount of absorbency, and/or the like for a particular wavelength range).

In some implementations, mirror 902 and mirror 908 may be configured to reflect a first portion of an electromagnetic spectrum (e.g., blue light) where mirror 902 is configured to reflect a first wavelength range of the first portion of the electromagnetic spectrum and mirror 908 is configured to reflect a second wavelength range of the first portion of the electromagnetic spectrum (e.g., mirror 902 and mirror 908 may be "mismatched" in the same color space), where a difference between a representative wavelength of the first wavelength range (e.g., the median wavelength of the first wavelength range) and a representative wavelength of the second wavelength range (e.g., the median wavelength of the second wavelength range) is greater than a threshold, such as 10 nm. In some implementations, mirror 904 and mirror 910 may be configured to reflect a second portion of the electromagnetic spectrum (e.g., green light) where mirror 904 is configured to reflect a first wavelength range of the second portion of the electromagnetic spectrum and mirror 910 is configured to reflect a second wavelength range of the second portion of the electromagnetic spectrum (e.g., mirror 904 and mirror 910 may be "mismatched" in the same color space), where a difference between a representative wavelength of the first wavelength range (e.g., the median wavelength of the first wavelength range) and a representative wavelength of the second wavelength range (e.g., the median wavelength of the second wavelength range) is greater than a threshold, such as 10 nm.

In this way, example optical filter 900 may provide a first pair of mismatched mirrors (e.g., mirror 902 and mirror 908) to provide greater fidelity in discerning wavelength ranges associated with the first portion of the electromagnetic spectrum and a second pair of mismatched mirrors (e.g., mirror 904 and mirror 910) to provide greater fidelity in discerning wavelength ranges associated with the second portion of the electromagnetic spectrum.

As indicated above, FIG. 9 is provided merely as an example. Other examples are contemplated and may differ from what is described with regard to FIG. 9.

Figure 10:
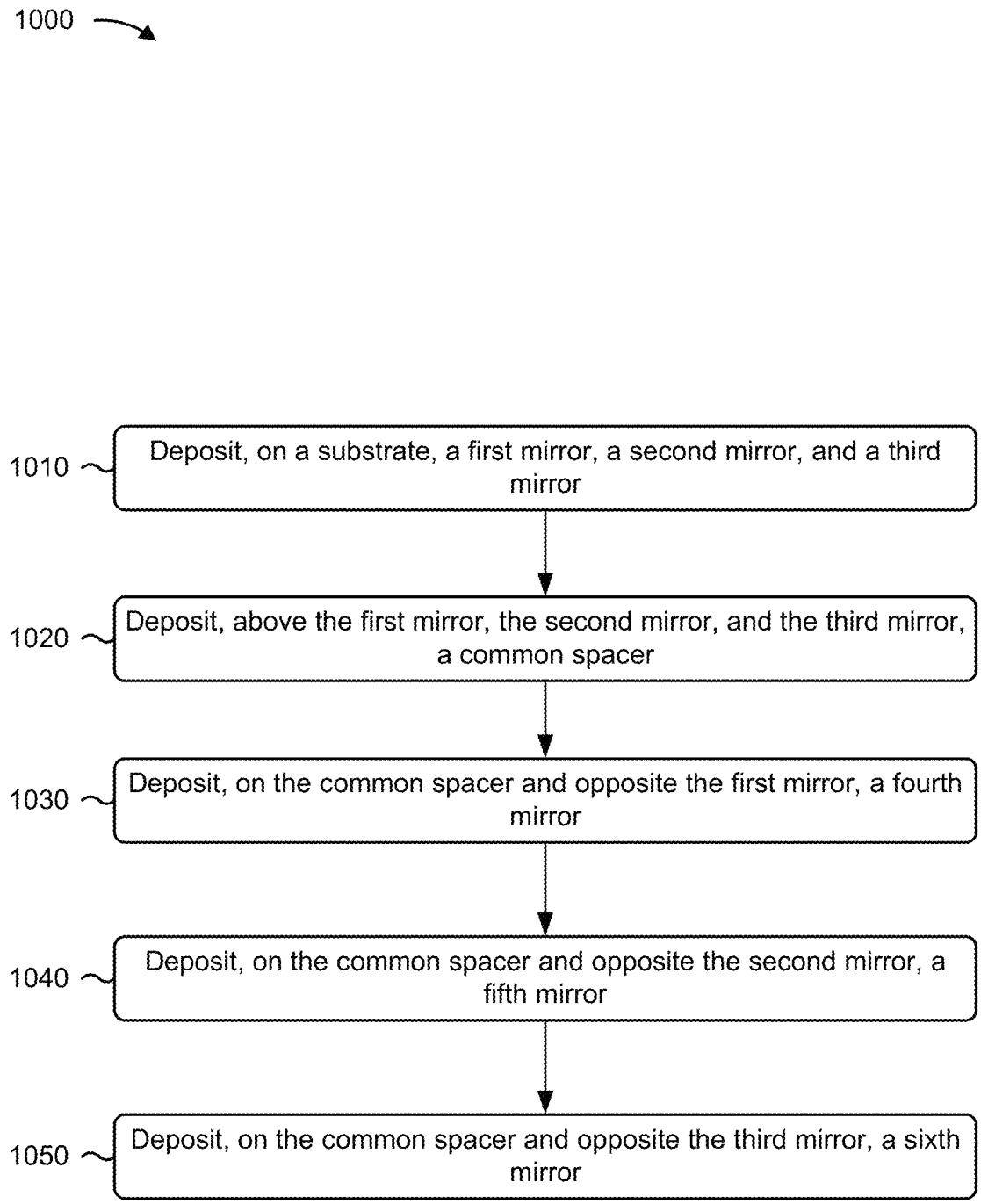
FIGS. 10-11 are flow charts of example processes relating to manufacturing an optical filter.

FIG. 10 is a flowchart of an example process 1000 associated with manufacturing an optical filter (e.g., an optical filter with at least a threshold number of channels, such as 128 channels, 192 channels, 256 channels, and/or the like). In some implementations, one or more process blocks of FIG. 10 may be performed by a manufacturing device. In some implementations, one or more process blocks of FIG. 10 may be performed by another device or a group of devices separate from or including the manufacturing device.

As shown in FIG. 10, process 1000 may include depositing, on a substrate, a first mirror, a second mirror, and a third mirror (block 1010). In some implementations, the first mirror, the second mirror, and the third mirror do not overlap each other.

As further shown in FIG. 10, process 1000 may include depositing, above the first mirror, the second mirror, and the third mirror, a common spacer (block 1020). In some implementations, depositing the common spacer may comprise depositing less than ten spacer layers.

In some implementations, process 1000 may include depositing, on the first mirror, a first baseline spacer; depositing, on the second mirror, a second baseline spacer; depositing, on the third mirror, a third baseline spacer; and depositing the common spacer on the first baseline spacer, the second baseline spacer, and the third baseline spacer.

As further shown in FIG. 10, process 1000 may include depositing, on the common spacer and opposite the first mirror, a fourth mirror (block 1030). In some implementations, the fourth mirror is paired with the first mirror to reflect a first portion of an electromagnetic spectrum.

As further shown in FIG. 10, process 1000 may include depositing, on the common spacer and opposite the second mirror, a fifth mirror (block 1040). In some implementations, the fifth mirror is paired with the second mirror to reflect a second portion of the electromagnetic spectrum.

As further shown in FIG. 10, process 1000 may include depositing, on the common spacer and opposite the third mirror, a sixth mirror (block 1050). In some implementations, the sixth mirror is paired with the third mirror to reflect a third portion of the electromagnetic spectrum.

Process 1000 may include additional implementations, such as any single implementation or any combination of implementations described below and/or in connection with one or more other processes described elsewhere herein.

In some implementations, depositing the common spacer comprises depositing a plurality of spacer layers such that the common spacer has a thickness that varies in a same pattern between the first mirror and the fourth mirror, between the second mirror and the fifth mirror, and between the third mirror and the sixth mirror.

In some implementations, depositing the first baseline spacer comprises depositing the first baseline spacer at a first thickness based on the first portion of the electromagnetic spectrum; depositing the second baseline spacer comprises depositing the second baseline spacer at a second thickness based on the second portion of the electromagnetic spectrum; and depositing the third baseline spacer comprises depositing the third baseline spacer at a third thickness based on the third portion of the electromagnetic spectrum.

In some implementations, the first portion of the electromagnetic spectrum is in a visible range of the electromagnetic spectrum; the second portion of the electromagnetic spectrum is in the visible range of the electromagnetic spectrum, and the third portion of the electromagnetic spectrum is in the visible range of the electromagnetic spectrum. In some implementations, the first portion of the electromagnetic spectrum is in a visible range of the electromagnetic spectrum; the second portion of the electromagnetic spectrum is in a first portion of the near-infrared range of the electromagnetic spectrum, and the third portion of the electromagnetic spectrum is in a second portion of the near-infrared range of the electromagnetic spectrum.

Although FIG. 10 shows example blocks of process 1000, in some implementations, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
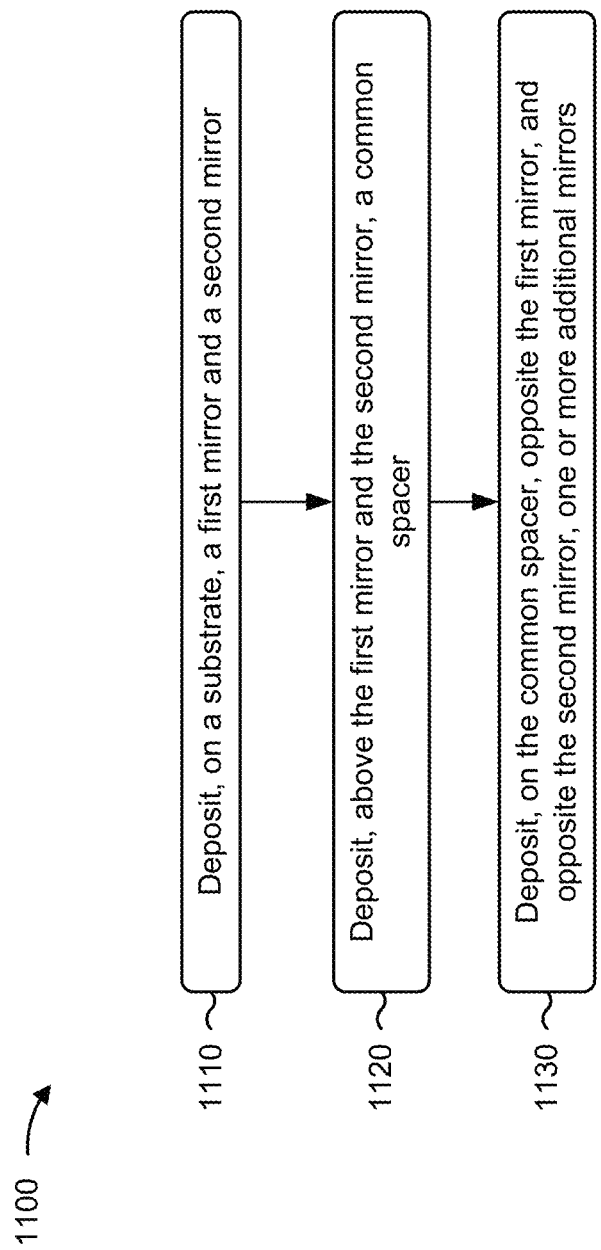

FIG. 11 is a flowchart of an example process 1100 associated with manufacturing an optical filter (e.g., an optical filter with at least a threshold number of channels, such as 128 channels, 192 channels, 256 channels, and/or the like). In some implementations, one or more process blocks of FIG. 11 may be performed by a manufacturing device. In some implementations, one or more process blocks of FIG. 11 may be performed by another device or a group of devices separate from or including the manufacturing device.

As shown in FIG. 11, process 1100 may include depositing, on a substrate, a first mirror and a second mirror, wherein the first mirror and the second mirror do not overlap (block 1110). In some implementations, the first mirror and the second mirror do not overlap. In some implementations, the first mirror is to reflect a set of first wavelengths of an electromagnetic spectrum; the second mirror is to reflect a set of second wavelengths of the electromagnetic spectrum; and second wavelengths of the set of second wavelengths are shifted with respect to first wavelengths of the set of first wavelengths. In some implementations, at least one of the set of first wavelengths or the set of second wavelengths is in a visible range of the electromagnetic spectrum and/or the near-infrared range of the electromagnetic spectrum.

As further shown in FIG. 11, process 1100 may include depositing, above the first mirror and the second mirror, a common spacer (block 1120).

As further shown in FIG. 11, process 1100 may include depositing, on the common spacer, opposite the first mirror, and opposite the second mirror, one or more additional mirrors (block 1130). The one or more additional mirrors may reflect one or more sets of other wavelengths that are different from the set of first wavelengths and different from the set of second wavelengths.

In some implementations, depositing the one or more additional mirrors comprises: depositing, opposite the first mirror, a third mirror paired with the first mirror to reflect the set of first wavelengths, and depositing, opposite the second mirror, a fourth mirror paired with the second mirror to reflect the set of second wavelengths. In some implementations, depositing the one or more additional mirrors comprises: depositing, opposite the first mirror and opposite the second mirror, a third mirror paired with the first mirror to reflect the set of first wavelengths.

Process 1100 may include additional implementations, such as any single implementation or any combination of implementations described in connection with one or more other processes described elsewhere herein.

Although FIG. 11 shows example blocks of process 1100, in some implementations, process 1100 may include additional blocks, fewer blocks, different blocks, or differently arranged blocks than those depicted in FIG. 11. Additionally, or alternatively, two or more of the blocks of process 1100 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, and/or the like, depending on the context.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "bottom," "above," "upper," "top," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. An optical filter, comprising:
   a first pair of mirrors that includes a first mirror and a second mirror;
   a second pair of mirrors that includes a third mirror and a fourth mirror,
      wherein the second pair of mirrors and the first pair of mirrors reflect different portions of an electromagnetic spectrum;
   a common spacer positioned between the first pair of mirrors and between the second pair of mirrors;
   a first baseline spacer disposed on a top surface of the first mirror and positioned below a bottom surface of the second mirror,
      wherein a first portion of the common spacer is between the first baseline spacer and the bottom surface of the second mirror; and
   a second baseline spacer disposed on a top surface of the third mirror and positioned below a bottom surface of the fourth mirror,
      wherein a second portion of the common spacer is between the second baseline spacer and the bottom surface of the fourth mirror,
      wherein a first thickness of the first baseline spacer is different from a second thickness of the second baseline spacer, and
      wherein a thickness of the common spacer varies across the optical filter.

2. The optical filter of claim 1, wherein a thickness of the common spacer across the first pair of mirrors varies in a same pattern as a thickness of the common spacer across the second pair of mirrors.

3. The optical filter of claim 1, wherein:
   the first thickness of the first baseline spacer is based on a first portion, of the different portions of the electromagnetic spectrum, reflected by the first pair of mirrors; and
   the second thickness of the second baseline spacer is based on a second portion, of the different portions of the electromagnetic spectrum, reflected by the second pair of mirrors.

4. The optical filter of claim 1, further comprising:
   a third pair of mirrors,
      wherein the common spacer is further positioned between the third pair of mirrors.

5. The optical filter of claim 4, wherein the optical filter has at least 128 channels.

6. The optical filter of claim 4, further comprising:
   a fourth pair of mirrors,
      wherein the fourth pair of mirrors reflects a first portion of a near-infrared range of the electromagnetic spectrum; and
   a fifth pair of mirrors,
      wherein the fifth pair of mirrors reflects a second portion of the near-infrared range of the electromagnetic spectrum; and
   wherein the first pair of mirrors, the second pair of mirrors, and the third pair of mirrors reflect different portions of a visible range of the electromagnetic spectrum.

7. The optical filter of claim 6, wherein the optical filter has at least 192 channels.

8. The optical filter of claim 1, wherein the common spacer includes less than 10 layers.

9. A method of manufacturing an optical filter, comprising:
   depositing, on a substrate, a first mirror, a second mirror, and a third mirror,
      wherein the first mirror, the second mirror, and the third mirror do not overlap each other,
   depositing a first baseline spacer above the first mirror;
   depositing a second baseline spacer above the second mirror,
      wherein a first thickness of the first baseline spacer is different from a second thickness of the second baseline spacer;
   depositing a common spacer above the first baseline spacer, the second baseline spacer, and the third mirror,
   depositing, on the common spacer and opposite the first mirror, a fourth mirror,
      wherein the fourth mirror is paired with the first mirror to reflect a first portion of an electromagnetic spectrum;
   depositing, on the common spacer and opposite the second mirror, a fifth mirror, wherein the fifth mirror is paired with the second mirror to reflect a second portion of the electromagnetic spectrum; and
   depositing, on the common spacer and opposite the third mirror, a sixth mirror,
      wherein the sixth mirror is paired with the third mirror to reflect a third portion of the electromagnetic spectrum, and
      wherein depositing the common spacer comprises depositing a plurality of spacer layers such that the common spacer has a thickness that varies in a same pattern between the first mirror and the fourth mirror, between the second mirror and the fifth mirror, and between the third mirror and the sixth mirror.

10. The method of claim 9, wherein depositing the common spacer comprises depositing less than ten spacer layers.

11. The method of claim 9, further comprising, before depositing the common spacer:
    depositing, on the third mirror, a third baseline spacer; and
       wherein depositing the common spacer comprises depositing the common spacer on the first baseline spacer, the second baseline spacer, and the third baseline spacer.

12. The method of claim 11, wherein:
    depositing the first baseline spacer comprises depositing the first baseline spacer at the first thickness based on the first portion of the electromagnetic spectrum;
    depositing the second baseline spacer comprises depositing the second baseline spacer at the second thickness based on the second portion of the electromagnetic spectrum; and
    depositing the third baseline spacer comprises depositing the third baseline spacer at a third thickness based on the third portion of the electromagnetic spectrum.

13. The method of claim 9, wherein:
    the first portion of the electromagnetic spectrum is in a visible range of the electromagnetic spectrum;
    the second portion of the electromagnetic spectrum is in the visible range of the electromagnetic spectrum; and
    the third portion of the electromagnetic spectrum is in the visible range of the electromagnetic spectrum.

14. The method of claim 9, wherein the optical filter has at least 128 channels.

15. The method of claim 9, wherein the common spacer includes less than 10 layers.

16. A method of manufacturing an optical filter, comprising:
- depositing, on a substrate, a first mirror and a second mirror,
  - wherein the first mirror and the second mirror do not overlap,
  - wherein the first mirror is to reflect a set of first wavelengths of an electromagnetic spectrum,
  - wherein the second mirror is to reflect a set of second wavelengths of the electromagnetic spectrum, and
  - wherein second wavelengths of the set of second wavelengths are shifted with respect to first wavelengths of the set of first wavelengths;
- depositing a first baseline spacer above the first mirror;
- depositing a second baseline spacer above the second mirror,
  - wherein a first thickness of the first baseline spacer is different from a second thickness of the second baseline spacer;
- depositing a common spacer above the first baseline spacer and the second baseline spacer,
  - wherein a thickness of the common spacer varies across the optical filter; and
- depositing, on the common spacer, opposite the first mirror, and opposite the second mirror, one or more additional mirrors.

17. The method of claim 16, wherein depositing the one or more additional mirrors comprises:
- depositing, opposite the first mirror, a third mirror paired with the first mirror to reflect the set of first wavelengths; and
- depositing, opposite the second mirror, a fourth mirror paired with the second mirror to reflect the set of second wavelengths.

18. The method of claim 16, wherein depositing the one or more additional mirrors comprises:
- depositing, opposite the first mirror and opposite the second mirror, a third mirror paired with the first mirror to reflect the set of first wavelengths.

19. The method of claim 16, wherein the one or more additional mirrors reflect one or more sets of other wavelengths that are different from the set of first wavelengths and different from the set of second wavelengths.

20. The method of claim 16, wherein at least one of the set of first wavelengths or the set of second wavelengths is in a near-infrared range of the electromagnetic spectrum.

\* \* \* \* \*